(12) United States Patent
Muir et al.

(10) Patent No.: US 9,477,237 B2
(45) Date of Patent: Oct. 25, 2016

(54) PILOT OPERATED GAS REGULATOR WITH DIAPHRAGM PROTECTION

(71) Applicant: TESCOM CORPORATION, Elk River, MN (US)

(72) Inventors: Gordon Cameron Muir, Maple Grove, MN (US); Timothy Patrick Franzwa, St. Cloud, MN (US)

(73) Assignee: TESCOM CORPORATION, Elk River, MN (US)

( * ) Notice: Subject to any disclaimer, the term of this patent is extended or adjusted under 35 U.S.C. 154(b) by 409 days.

(21) Appl. No.: 14/252,969

(22) Filed: Apr. 15, 2014

(65) Prior Publication Data
US 2014/0358301 A1 Dec. 4, 2014

Related U.S. Application Data

(60) Provisional application No. 61/830,320, filed on Jun. 3, 2013.

(51) Int. Cl.
*G05D 7/00* (2006.01)
*G05D 16/20* (2006.01)
(Continued)

(52) U.S. Cl.
CPC ...... *G05D 16/2093* (2013.01); *G05D 16/0636* (2013.01); *G05D 16/2053* (2013.01); *F16K 7/12* (2013.01); *G05D 7/012* (2013.01)

(58) Field of Classification Search
CPC .................................................. G05D 16/2093
USPC .................................................. 700/275–306
See application file for complete search history.

(56) References Cited

U.S. PATENT DOCUMENTS 4,457,329 A * 7/1984 Werley ................... F16K 17/383
137/505.42

5,771,921 A * 6/1998 Johnson ................... F16K 21/18
137/491

(Continued)

FOREIGN PATENT DOCUMENTS

WO WO-2010099623 A1 9/2010

OTHER PUBLICATIONS

Vandelli, Nelsimar, et al. "Development of a MEMS microvalve array for fluid flow control." Journal of Microelectromechanical systems 7.4 (1998): pp. 395-403.*

(Continued)

*Primary Examiner* — Satish Rampuria
(74) *Attorney, Agent, or Firm* — Marshall, Gerstein & Borun LLP

(57) ABSTRACT

A method of controlling a regulator with a pilot device includes periodically detecting an outlet pressure at an outlet of the regulator with a feedback pressure sensor. The method also includes comparing each detected outlet pressure with a set-point control pressure. Additionally, the method includes opening an exhaust valve when a detected outlet pressure is greater than the set-point control pressure so that a loading gas, which is applied to a top surface of a diaphragm of the regulator, exhausts out through the exhaust valve to reduce loading on the diaphragm. The method further includes sensing a loading pressure in the outlet port with a loading pressure sensor after opening the exhaust valve and comparing the loading pressure to a predetermined minimum threshold pressure. When the loading pressure is equal to or less than the predetermined minimum threshold value, the method includes closing the exhaust valve.

21 Claims, 6 Drawing Sheets

(51) Int. Cl.
*G05D 16/06* (2006.01)
*F16K 7/12* (2006.01)
*G05D 7/01* (2006.01)

(56) References Cited

U.S. PATENT DOCUMENTS

| | | | | |
|---|---|---|---|---|
| 5,890,512 | A | * | 4/1999 | Gotthelf ............. G05D 16/0663 137/375 |
| 2008/0023662 | A1 | * | 1/2008 | Reinicke ............... F16K 15/183 251/58 |
| 2010/0090137 | A1 | * | 4/2010 | Kato .................... G05D 7/0635 251/61.1 |

OTHER PUBLICATIONS

Jerman, Hal. "Electrically activated normally closed diaphragm valves." Journal of Micromechanics and Microengineering 4.4 (1994): pp. 210-216.*

Ziegler, J. G., and N. B. Nichols. "Process lags in automatic control circuits." Trans. ASME 65.5 (1943): pp. 433-443.*

International Preliminary Report on Patentability and Written Opinion of the International Searching Authority for International Application No. PCT/US2014/040612, dated Dec. 17, 2015.

International Search Report and Written Opinion of the International Searching Authority for PCT/US2014/040612, dated Sep. 1, 2014.

* cited by examiner

PILOT OPERATED GAS REGULATOR WITH DIAPHRAGM PROTECTION

CROSS-REFERENCE TO RELATED APPLICATIONS

The priority benefit of U.S. Provisional Patent Application No. 61/830,320, filed Jun. 3, 2013, is hereby claimed and the entire contents thereof are incorporated herein by reference.

FIELD OF THE DISCLOSURE

The present disclosure is directed to process control systems and, more particularly, field devices such pressure regulators and pilot loading mechanisms for pressure regulators used in process control systems.

BACKGROUND

Process control systems, such as distributed or scalable process control systems like those used in chemical, petroleum or other processes, typically include one or more process controllers communicatively coupled to at least one host or user workstation and to one or more field devices via analog, digital or combined analog/digital buses. The field devices, which may include, for example, control valves, valve positioners, regulators, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals, which are sent over the buses to the field devices to control the operation of the process. Information from each of the field devices and the controller is typically made available to one or more applications executed by the user workstation to enable an operator to perform any desired function regarding the process, such as viewing the current state of the process, modifying the operation of the process, etc. In the event that a field device fails, the operational state of the entire process control system can be jeopardized.

SUMMARY

One aspect of the present disclosure includes a method of controlling a regulator with a pilot device having an inlet port with an inlet valve, an exhaust port with an exhaust valve, an outlet port connected to the regulator, and a loading pressure sensor for detecting the pressure in the outlet port. The method includes periodically detecting an outlet pressure at an outlet of the regulator with a feedback pressure sensor. The method also includes comparing each detected outlet pressure with a set-point control pressure. Additionally, the method includes opening an exhaust valve of the pilot device when a detected outlet pressure is determined to be greater than the set-point control pressure such that a loading gas in the pilot device, which is applied to a top surface of a diaphragm of the regulator, exhausts out through the exhaust valve to reduce loading on the diaphragm. The method further includes sensing a loading pressure in the outlet port of the pilot valve with the loading pressure sensor after opening the exhaust valve and comparing the loading pressure to a predetermined minimum threshold pressure. Moreover, the method includes closing the exhaust valve when the loading pressure is determined to be equal to or less than the predetermined minimum threshold value.

DETAILED DESCRIPTION

The present disclosure is directed to an intelligent pilot operated regulator, which can be a field device of a process control system, for example. More specifically, the pilot operated regulator is equipped with a regulator diaphragm protection feature that gives an added layer of protection for applications where rapidly changing flow demands put undue stress on the sensing element of diaphragm sensed regulators, particularly those with metal diaphragms.

Figure 1:
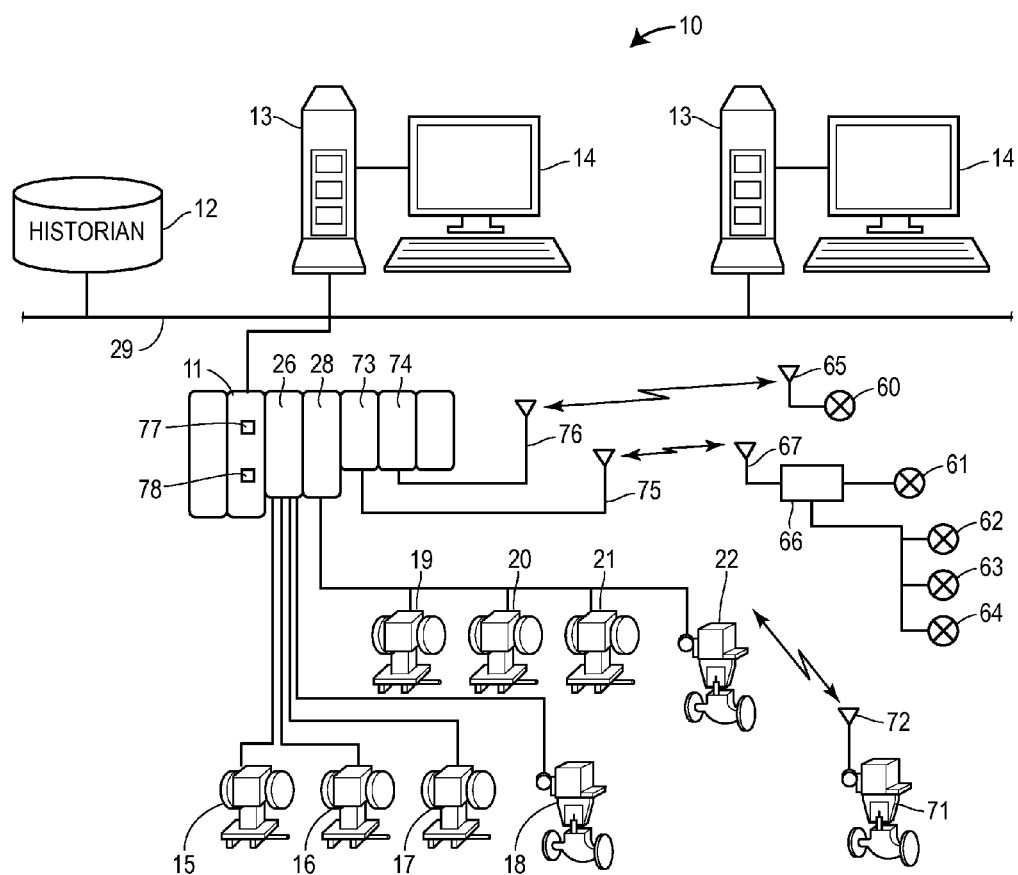
FIG. 1 is a schematic representation of a process control system having one or more pilot operated gas regulators constructed in accordance with the principles of the present disclosure.

Referring now to FIG. 1, a process control system 10 constructed in accordance with one version of the present disclosure is depicted incorporating one or more field devices 15, 16, 17, 18, 19, 20, 21, 22, and 71 in communication with a process controller 11, which in turn, is in communication with a data historian 12 and one or more user workstations 13, each having a display screen 14. So configured, the controller 11 delivers signals to and receives signals from the field devices 15, 16, 17, 18, 19, 20, 21, 22, and 71 and the workstations 13 to control the process control system.

In additional detail, the process controller 11 of the process control system 10 of the version depicted in FIG. 1 is connected via hardwired communication connections to field devices 15, 16, 17, 18, 19, 20, 21, and 22 via input/output (I/O) cards 26 and 28. The data historian 12 may be any desired type of data collection unit having any desired type of memory and any desired or known software, hardware or firmware for storing data. Moreover, while the data historian 12 is illustrated as a separate device in FIG. 1, it may instead or in addition be part of one of the workstations 13 or another computer device, such as a server. The controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the controller 11 is illustrated as being communicatively connected to the field devices 15, 16, 17, 18, 19, 20, 21, and 22 using a hardwired communication scheme which may include the use of any desired hardware, software and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, and 22 may be any types of devices, such as sensors, control valve assemblies, transmitters, positioners, etc., while the I/O cards 26 and 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices, that communicate over a digital bus to the I/O card 28 using Fieldbus protocol communications. Of course, the field devices 15, 16, 17, 18, 19, 20, 21, and 22 may conform to any other desired standard(s) or protocols, including any standards or protocols developed in the future.

In addition, the process control system 10 depicted in FIG. 1 includes a number of wireless field devices 60, 61, 62, 63, 64 and 71 disposed in the plant to be controlled. The field devices 60, 61, 62, 63, 64 are depicted as transmitters (e.g., process variable sensors) while the field device 71 is depicted as a control valve assembly including, for example, a control valve and an actuator. Wireless communications may be established between the controller 11 and the field devices 60, 61, 62, 63, 64 and 71 using any desired wireless communication equipment, including hardware, software, firmware, or any combination thereof now known or later developed. In the version illustrated in FIG. 1, an antenna 65 is coupled to and is dedicated to perform wireless communications for the transmitter 60, while a wireless router or other module 66 having an antenna 67 is coupled to collectively handle wireless communications for the transmitters 61, 62, 63, and 64. Likewise, an antenna 72 is coupled to the control valve assembly 71 to perform wireless communications for the control valve assembly 71. The field devices or associated hardware 60, 61, 62, 63, 64, 66 and 71 may implement protocol stack operations used by an appropriate wireless communication protocol to receive, decode, route, encode and send wireless signals via the antennas 65, 67 and 72 to implement wireless communications between the process controller 11 and the transmitters 60, 61, 62, 63, 64 and the control valve assembly 71.

If desired, the transmitters 60, 61, 62, 63, 64 can constitute the sole link between various process sensors (transmitters) and the process controller 11 and, as such, are relied upon to send accurate signals to the controller 11 to ensure that process performance is not compromised. The transmitters 60, 61, 62, 63, 64, often referred to as process variable transmitters (PVTs), therefore may play a significant role in the control of the overall control process. Additionally, the control valve assembly 71 may provide measurements made by sensors within the control valve assembly 71 or may provide other data generated by or computed by the control valve assembly 71 to the controller 11 as part of its operation. Of course, as is known, the control valve assembly 71 may also receive control signals from the controller 11 to effect physical parameters, e.g., flow, within the overall process.

The process controller 11 is coupled to one or more I/O devices 73 and 74, each connected to a respective antenna 75 and 76, and these I/O devices 73 and 74 and antennas 75 and 76 operate as transmitters/receivers to perform wireless communications with the wireless field devices 61, 62, 63, 64 and 71 via one or more wireless communication networks. The wireless communications between the field devices (e.g., the transmitters 60, 61, 62, 63, 64 and the control valve assembly 71) may be performed using one or more known wireless communication protocols, such as the WirelessHART® protocol, the Ember protocol, a WiFi protocol, an IEEE wireless standard, etc. Still further, the I/O devices 73 and 74 may implement protocol stack operations used by these communication protocols to receive, decode, route, encode and send wireless signals via the antennas 75 and 76 to implement wireless communications between the controller 11 and the transmitters 60, 61, 62, 63, 64 and the control valve assembly 71.

As illustrated in FIG. 1, the controller 11 conventionally includes a processor 77 that implements or oversees one or more process control routines (or any module, block, or sub-routine thereof) stored in a memory 78. The process control routines stored in the memory 78 may include or be associated with control loops being implemented within the process plant. Generally speaking, and as is generally known, the process controller 11 executes one or more control routines and communicates with the field devices 15, 16, 17, 18, 19, 20, 21, 22, 60, 61, 62, 63, 64, and 71, the user workstations 13 and the data historian 12 to control a process in any desired manner(s). Additionally, any one of the field devices 18, 22, and 71 in FIG. 1, each of which is depicted as a control valve assembly, can include an intelligent control valve actuator constructed in accordance with the principles of the present disclosure for communicating with the process controller 11 in order to facilitate monitoring of the actuator's health and integrity.

Figure 2:
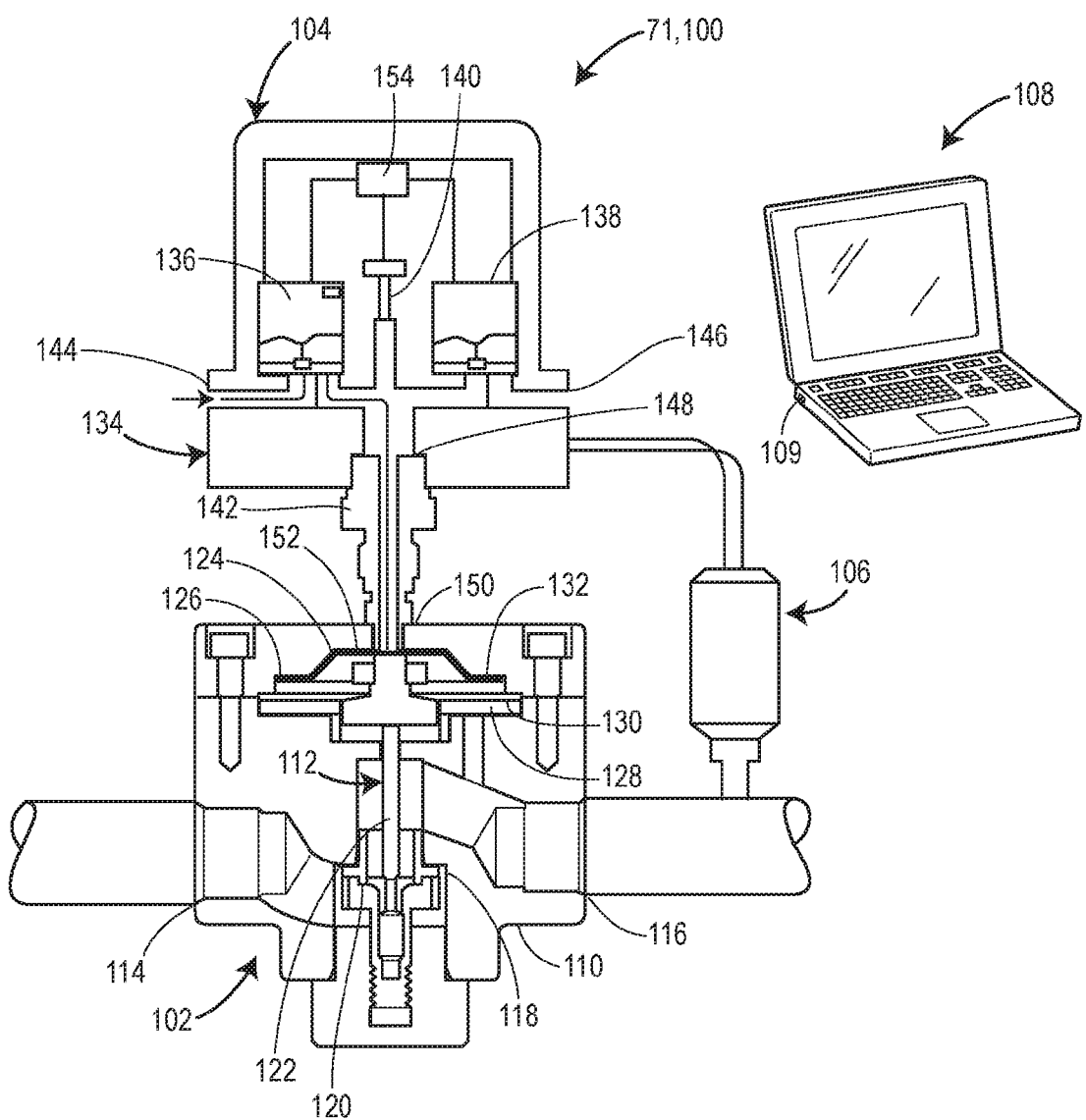
FIG. 2 is a cross-sectional side view of one version of a pilot operated gas regulator constructed in accordance with the principles of the present disclosure.

Referring now to FIG. 2, for the sake of description, field device 71 from FIG. 1 is shown as an intelligent regulator assembly 100 constructed in accordance with the principles of the present disclosure. In FIG. 2, the intelligent regulator assembly 100 includes a regulator 102, a pilot device 104, and a feedback pressure sensor 106. Additionally, FIG. 2 depicts an optional personal computing device 108 communicatively coupled to the pilot device 104 via a communication interface 109 such as a USB port, for example, to enable user interaction with the pilot device 104, as will be described.

The regulator 102 includes a valve body 110 and a control assembly 112. The valve body 110 defines an inlet 114, an outlet 116, and a gallery 118 defining a seating surface 120. The control assembly 112 is carried within the valve body 110 and includes a control element 122 operably connected to a diaphragm assembly 124. The control element 122 is movable between a closed position in sealing engagement with the seating surface 120 and an open position spaced away from the seating surface 120 in response to pressure changes across the diaphragm assembly 124. As depicted, the diaphragm assembly 124 includes a diaphragm 126 disposed within a diaphragm cavity 128 of the valve body 110 of the regulator 102. A bottom surface 130 of the diaphragm 126 is in fluid communication with the outlet 116 of the valve body 110 and a top surface 132 of the diaphragm 126 is in fluid communication with the pilot device 104 via the diaphragm cavity 128 and a pilot opening 150 in the valve body 110. The portion of the diaphragm cavity 128 above the top surface 132 of the diaphragm 126 can be referred to as the dome 152 of the regulator 102.

The pilot device 104 includes a valve body 134, an inlet valve 136, an exhaust valve 138, a pressure sensor 140, and an outlet adaptor 142. The valve body 134 defines an inlet port 144, an exhaust port 146, and an outlet port 148. The inlet port 144 is adapted to be connected to a source of supply gas for loading the dome 152 of the regulator 102 above the diaphragm 126, as will be described. As depicted, the inlet valve 136 is disposed adjacent to the inlet port 144, the exhaust valve 138 is disposed adjacent to the exhaust port 146, and the outlet adaptor 142 extends from the outlet port 148 and to the pilot opening 150 in the valve body 110. Thus, the outlet adaptor provides 142 fluid communication between the pilot device 104 and the regulator 102. The pressure sensor 140 is disposed in the valve body 134 of the pilot device 140 at a location between the inlet and outlet valves 136, 138. As such, the pressure sensor 104 is operable to sense the pressure between the inlet and outlet valves 136, 138, as well as in the outlet port 148, the outlet adaptor 142, and the diaphragm cavity 128 adjacent to the top surface 132 of the diaphragm 126, which is also referred to as the dome 152. In one version of the pilot device 104, the inlet and exhaust valves 136, 138 can be solenoid valves such as Pulse Width Modulation (PWM) solenoid valves and the pressure sensor 140 can be a pressure transducer. Moreover, the inlet and exhaust valves 136, 138 and the pressure sensor 140 can be communicatively coupled to an on-board controller 154, which can store logic and/or direct some or all of the functionality of the pilot device 104, as will be described below.

Still referring to FIG. 2, the feedback pressure sensor 106 of the assembly 100 includes a pressure transducer arranged to detect the pressure at the outlet 116 of the regulator 102 and transmit signals to the pilot device 104 and, more particularly, to the on-board controller 154 of the pilot device 104. Based on the signals received by the on-board controller 154 from the feedback pressure sensor 106, the pilot device 104 opens and/or closes the inlet and exhaust valves 136, 138 to control the pressure in the dome 152 of the regulator 102, which in turn, controls the position of the control element 122 and ultimately the pressure at the outlet 116 of the regulator 102.

For example, during normal operation, the pressure at the outlet 116 of the regulator 102 is controlled and maintained as desired by adjusting the pressure in the dome 152 of the regulator 102. This is achieved via operation of the pilot device 104 and feedback pressure sensor 106. In one version, the feedback pressure sensor 106 detects the pressure at the outlet 116 every 25 milliseconds and transmits a signal to the on-board controller 154 of the pilot device 104. The on-board controller 154 compares this signal, which is indicative of the pressure at the outlet 116, to a desired set-point value, which is indicative of a desired set-point pressure, and determines if the outlet pressure is less than, equal to, or greater than the set-point pressure. Based on this determination, the pilot device 104 manipulates either or both of the inlet and exhaust valves 136, 138 to adjust the pressure in the dome 152. That is, if the sensed outlet pressure is lower than the desired set-point pressure, the on-board controller 154 activates the inlet valve 136 (e.g., instructs the inlet valve 136 to open and optionally instructs the exhaust valve 138 to close). In this configuration, gas enters the inlet port 144 of the pilot device 104 and increases the pressure in the dome 152, which causes the diaphragm assembly 124 to urge the control element 122 downward relative to the orientation of FIG. 2, which opens the regulator 102 and increases flow and ultimately pressure at the outlet 116. In contrast, if the pressure sensed at the outlet 116 by the feedback pressure sensor 106 is determined to be higher than the desired set-point pressure, the on-board controller 154 activates the exhaust valve 138 (e.g., instructs the exhaust valve 138 to open and optionally the inlet valve 136 to close). In this configuration, gas in the dome 152 exhausts out through the exhaust port 146 of the pilot device 104 to decrease the pressure on the top surface 132 of the diaphragm 126. This allows the outlet pressure to urge the diaphragm assembly 124 and control element 122 upward relative to the orientation of FIG. 2, which closes the regulator 102 and decreases flow and ultimately pressure at the outlet 116.

Based on the foregoing description, it should be appreciated that the pilot device 104 and the feedback pressure sensor 106 operate in combination with each other to intermittently, yet frequently, monitor the pressure at the outlet 116 of the regulator 102 and adjust the pressure in the dome 152 until the pressure at the outlet 116 is equal to the set-point pressure. While the foregoing description indicates that measurements are taken by the feedback pressure sensor 106 and the loading pressure sensor 140 every 25 milliseconds, this is an example, and the frequency or rate can be generally any frequency or rate depending on the desired application.

Figure 3:
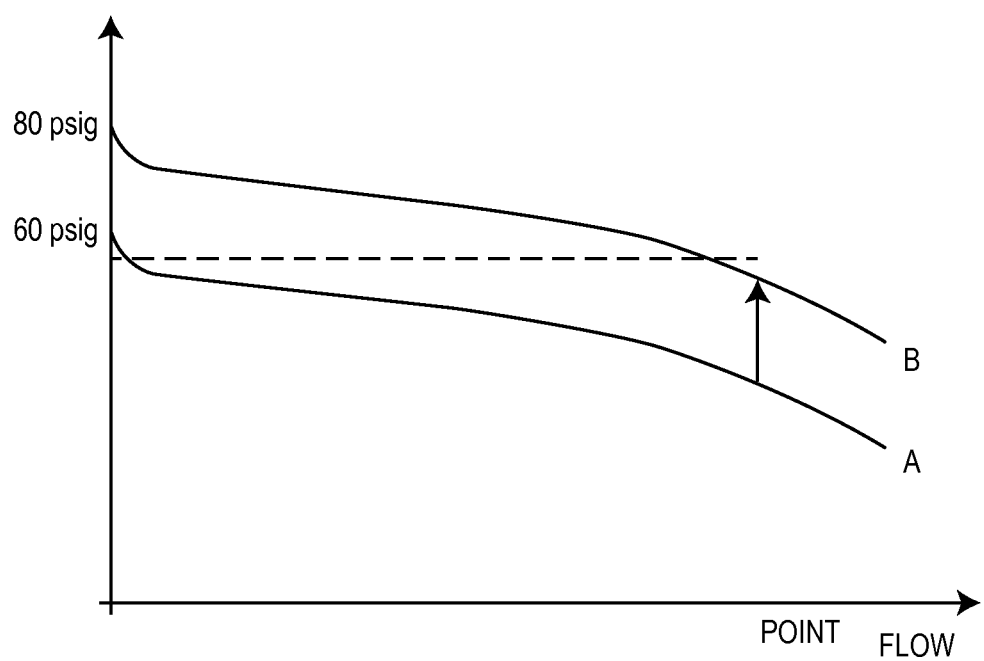
FIG. 3 is a graphical representation of the operation of a known gas regulator.

The assembly 100 disclosed herein can also overcome the well-known phenomenon known as 'droop' in normal, open loop pressure reducing regulators. 'Droop' is a term of art referring to a reduction in the pressure at the outlet 116 of the regulator 102 as flow rate increases. This phenomenon can be generally illustrated with reference to FIG. 3. In the scenario shown in FIG. 3, the regulator 102 can be set to provide an outlet pressure of 60 psig at no flow through the assembly 100. This is illustrated with curve A in FIG. 3. As demand is turned on and flow increases to the required rate, indicated by the "point" arrow, droop causes the outlet pressure to fall to a value that is less than the desired 60 psig. With conventional regulator assemblies, this droop could only be compensated for by the operator increasing the load force on the top surface 132 of the diaphragm 126, which is typically provided by a spring, for example, to bring back up to 60 psig during the flowing condition. This is shown with curve B in FIG. 3. However, the downside of this conventional design is that when flow through the regulator is quickly terminated due to an operator closing a downstream valve, for example, the outlet pressure increases based on the increased load force. Curve B in FIG. 3 shows that static (e.g., no flow) pressure might rise to 80 psig. Some customer applications cannot accept this large variation in outlet pressure with flow.

Figure 4:
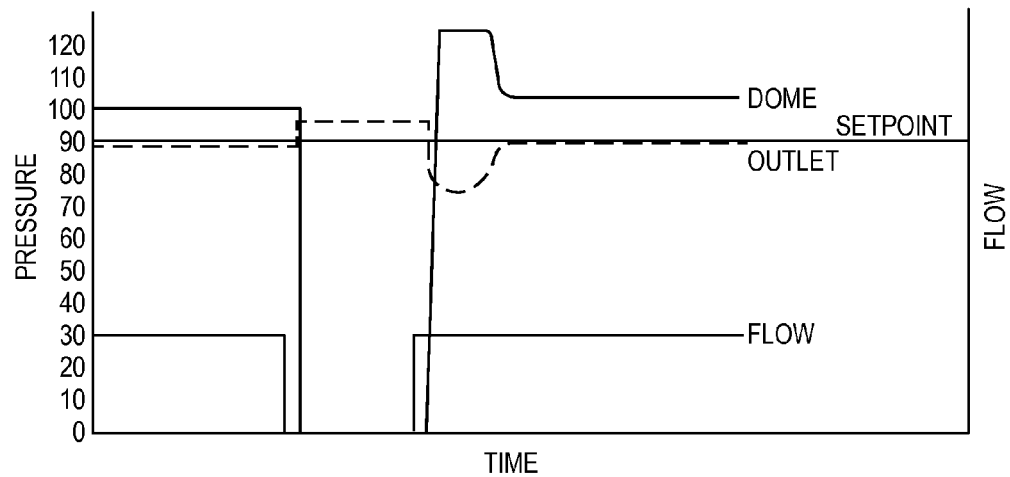
FIG. 4 is a graphical representation of the operation of a known gas regulator.

By using the assembly 100 disclosed herein and, more particularly, the pilot device 104 described above with reference to FIG. 2, the outlet pressure can remain 60 psig, regardless of flow requirements or inlet pressure fluctuations. There are, however, some performance differences when the regulator 102 of FIG. 2 is a vented regulator compared to when it is a non-vented regulator. When the regulator 102 is a vented regulator, abrupt increases in the outlet pressure can vent out of the assembly and reduce the back pressure on the various assembly components. But, when the regulator 102 is a non-vented regulator, which may be used to meet certain environmental requirements, for example, abrupt increases in outlet pressure create back-pressures that cannot be vented and certain stresses placed on the assembly components can reduce the useful life of the device. One example of this is shown in FIG. 4. FIG. 4 shows a configuration where the set-point pressure is set to approximately 90 psig. FIG. 4 also shows the pressure in the dome 152 of the regulator 102 and the pressure at the outlet 116 of the regulator 102. Finally, FIG. 4 shows the flow through the regulator 102. The pressures are shown on the psig scale, while the flow is represented in terms of liters in FIG. 4. As indicated to the left side of FIG. 4, to maintain 90 psig outlet pressure at a determined flow rate, the dome 152 needs to be loaded to 100 psig to compensate for the effects of droop. When flow through the regulator 102 abruptly stops, the outlet pressure increases and creates a backpressure in the trapped, non-vented regulator, up to 95 psig. This is shown between the vertical lines on the graph of FIG. 4.

Under these conditions, prior pilot devices would vent the dome 152 by opening the exhaust valve 138 of the pilot device 104 until the outlet pressure reaches the desired 90 psig. However, as mentioned above, with non-vented regulators, the outlet pressure is trapped and, as such, it will never fall to 90 psig. The pilot device 104, would, however, continue venting the dome 152 because the signal from the feedback pressure sensor 106 would keep telling the pilot device 104 that the outlet pressure is too high. Thus, the pressure in the dome 152 would ultimately vent to 0 psig. This is also illustrated between the tall generally vertical lines on the graph of FIG. 4. With the dome pressure vented to 0 psig, the regulator 102 possesses an imbalance of forces across the diaphragm 126 of approximately 95 psig. This is a large pressure difference that places high stresses on the diaphragm assembly 124.

Continuing to refer to FIG. 4, when downstream demand returns and flow through the regulator 102 starts again, the pressure at the outlet 116 of the regulator 102 initially drops, and with the dome pressure at 0 psig, it will continue to drop. But, the pilot device 104 via the feedback pressure controller 106, senses when the outlet pressure falls below 90 psig and then again starts loading the dome 152 by closing the exhaust valve 138 and opening the inlet valve 136. As discussed above, the pilot device 104 might check the outlet pressure every 25 milliseconds, and until it starts to see an increase in the outlet pressure, it will fully load the dome 152. The foregoing cyclic action of the pressure in the dome 152 applies large stress on the diaphragm 126 and greatly reduces the life of the device. Moreover, the rate of initial droop combined with fully loading the dome further diminishes the performance capability due to the fluctuating outlet pressure.

To alleviate these concerns, the pilot device 104 of the present disclosure is equipped to specifically limit the amount by which the pressure in the dome 152 is exhausted when flow through the regulator 102 is abruptly and/or instantaneously terminated. By default, the pilot device 104 of the present disclosure will not allow the dome 152 to vent less than a predetermined percentage of the set-point pressure. This process can generally be illustrated in graphical form, as presented in FIG. 5. As indicated to the left side of FIG. 5, similar to that which was described with reference to FIG. 4, to maintain 90 psig outlet pressure at a determined flow rate, the dome 152 needs to be loaded to 100 psig to compensate for the effects of droop. When flow through the regulator 102 abruptly stops because of downstream demand being terminated, for example, the outlet pressure abruptly increases and creates some backpressure in the trapped, non-vented regulator 102. This is shown in the middle region of the graph of FIG. 5.

Figure 5:
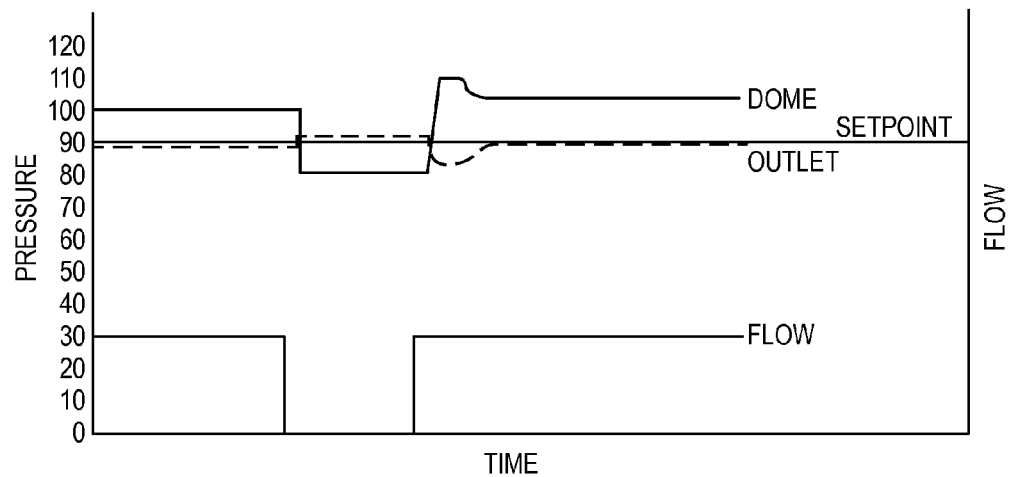
FIG. 5 is a graphical representation of the pilot operated gas regulator constructed in accordance with the present disclosure.

Under these conditions, the pilot device 104 of the present disclosure opens the exhaust valve 138 to begin venting pressure from the dome 152, while maintaining the inlet valve 136 closed. Because it is known that the trapped outlet pressure will never drop in the non-vented regulator 102, the pilot device 104 stops venting when the pressure in the dome 152 reaches a predetermined minimum threshold pressure. In the example illustrated in FIG. 5, the predetermined minimum threshold pressure is approximately 90% of the set-point pressure. As mentioned, the set-point pressure in FIG. 5 is approximately 90 psig and, thus, the predetermined minimum threshold pressure in FIG. 5 is approximately 81 psig. This is illustrated in FIG. 5 with the lower horizontal line between the generally vertical lines in the mid-region of the graph. In other applications, the set-point pressure can be generally any desired value and the predetermined minimum threshold pressure can be generally any value that is less than the set-point pressure but greater than 0. For example, the predetermined minimum threshold value can be a value in a range of approximately 50% to approximately 95% of the set-point pressure, a value in a range of approximately 60% to approximately 95% of the set-point pressure, a value in a range of approximately 70% to approximately 95% of the set-point pressure, a value in a range of approximately 50% to approximately 90% of the set-point pressure, a value in a range of approximately 60% to approximately 90% of the set-point pressure, a value in a range of approximately 70% to approximately 90% of the set-point pressure, a value in a range of approximately 50% to approximately 85% of the set-point pressure, a value in a range of approximately 60% to approximately 85% of the set-point pressure, or a value in a range of approximately 70% to approximately 85% of the set-point pressure. These ranges and percentages should be understood as merely examples and any other percentages and ranges of percentages are intended to be within the scope of the disclosure so long as the predetermined minimum threshold pressure is greater than zero and less than or equal to the set-point pressure.

Regardless of the actual value of the predetermined minimum threshold value relative to the set-point pressure, a key distinction relative to conventional operation of pilot devices such as those described above with reference to FIG. 4, for example, is that the pilot device 104 of the present disclosure limits the reduction in the pressure in the dome 152 so as to minimize the imbalance of forces across the diaphragm 126 upon the occurrence of abrupt termination of demand. In FIG. 5, difference in forces or pressure is illustrated by the offset of the dome pressure and the outlet pressure in the mid-region between the generally vertical lines and, as illustrated, never exceeds approximately 14 psig (i.e., the difference between the 95 psig outlet pressure and the 81 psig dome pressure). This advantageously reduces the amount of force and stress imbalances applied to the diaphragm 126 under the foregoing operating conditions and increases the overall useful life of the diaphragm 126 and diaphragm assembly 124. Moreover, as seen in FIG. 5, this control also allows for quicker response times when demand returns and flow re-initiates and reduces the total variance between the outlet and the set-point pressure at any given time of operation. Specifically, when comparing FIG. 4 with FIG. 5, it can be seen that when flow returns, which is depicted by the second generally vertical line from the left, the dome pressure in FIG. 5 does not spike as high or for as long a duration as it does in FIG. 4, and the outlet pressure in FIG. 5 does not fall as low or for as long of a duration as it does in FIG. 4 before returning to a stable flow condition. The delay in response time with the conventional process illustrated in FIG. 4 is partly due to the fact that the dome has exhausted to 0 psig and is therefore empty. Thus, it takes additional time to fill the dome with loading gas. In contrast, with the process depicted in FIG. 5, the dome is never empty and thus it takes much less time to return to the normal operating pressure. The faster response time provided by the subject matter of the present disclosure improves accuracy and regulator performance.

Figure 6:
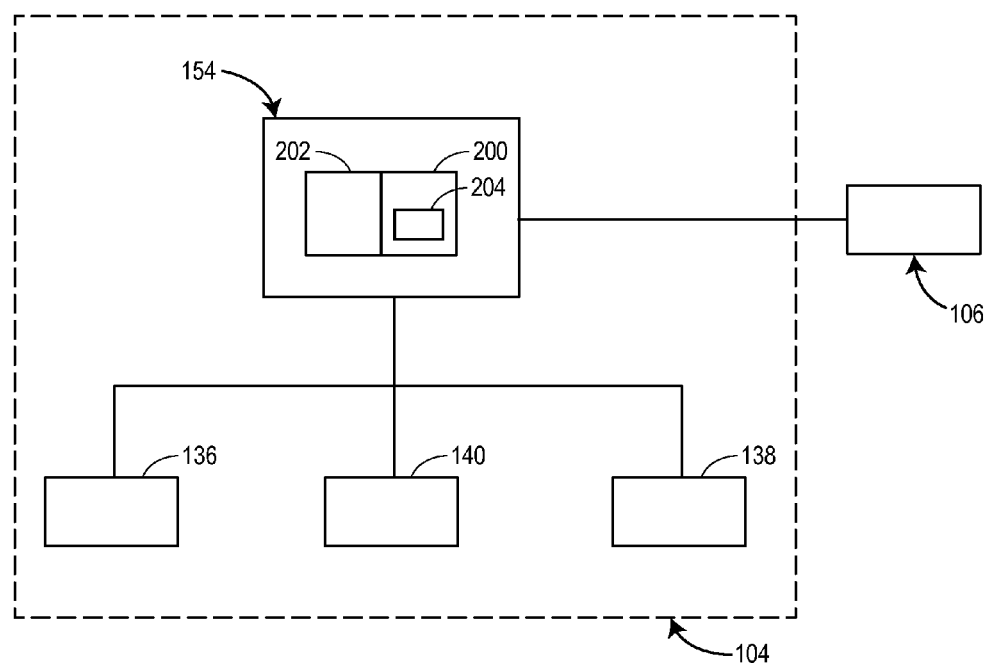
FIG. 6 is a block diagram of some of the components of the pilot operated gas regulator of the present disclosure.

While the concept of the present disclosure has thus far been described in reference to graphs illustrating the variations in pressure and flow through the regulator 102, the present disclosure also encompasses the actual system and methods for operating the assembly 100 to achieve the aforementioned results. For example, with reference to FIG. 6, one version of the electrically connected hardware components of the pilot device 104 and feedback pressure sensor 106 are illustrated in schematic block diagram form. That is, consistent with that described above, the pilot device 104 includes the on-board controller 154, inlet and exhaust valves 136, 138, and loading pressure sensor 140. The feedback pressure sensor 106 is communicatively coupled to the on-board controller 154 such that pressure signals can be transmitted to the pilot device 104.

Figure 7:
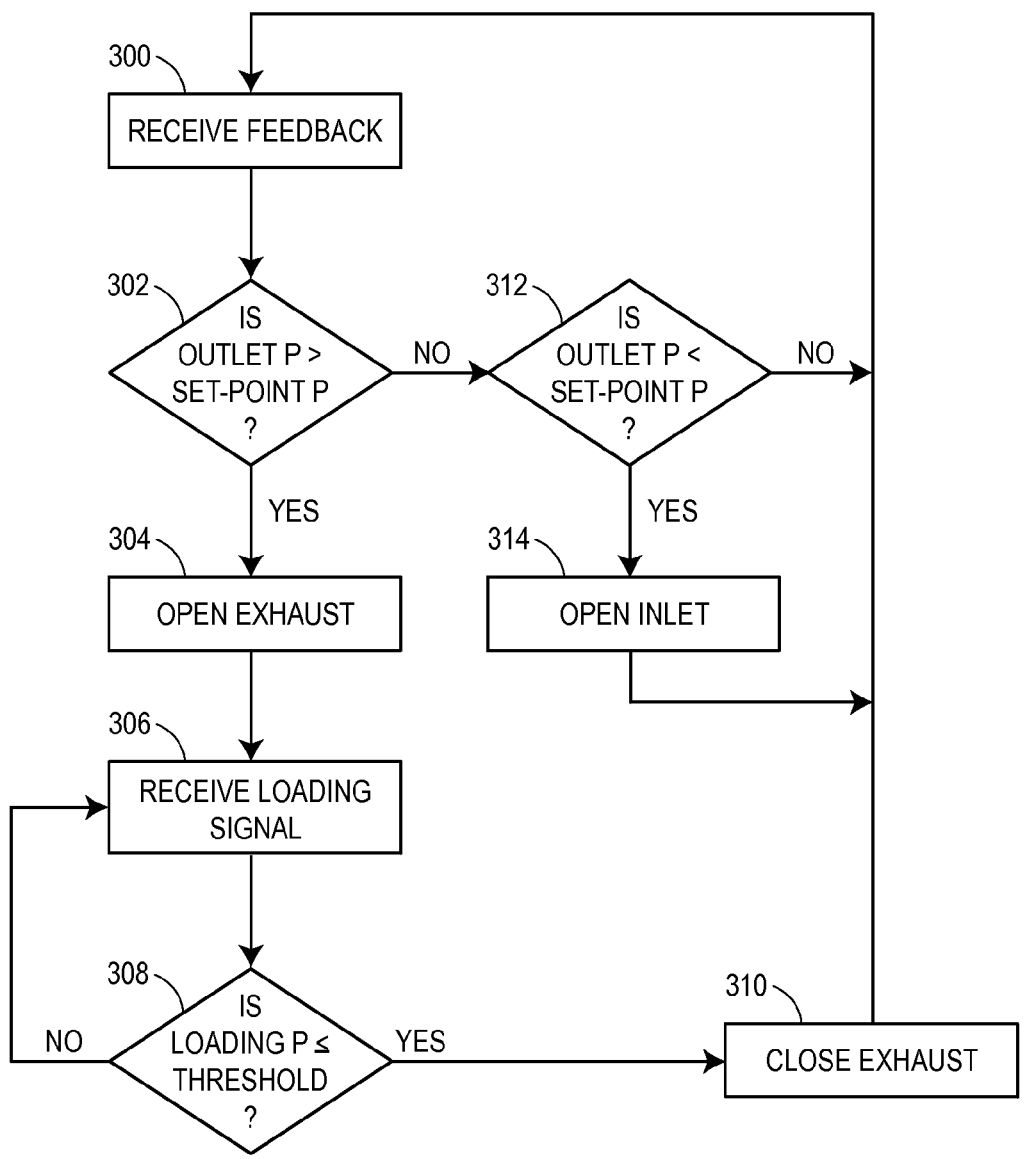
FIG. 7 is a process flow chart showing one version of a method for controlling a regulator with a pilot device in accordance with the present disclosure.

In one version of the pilot device 104, the on-board controller 154 can include a memory 200, a processor 202, and logic 204 stored on the memory 200. The logic 204 stored on the memory 200 is executable by the processor 202 for performing a variety of routines and sub-routines to effect the functionality described above with reference to FIG. 5, for example, as well as other functionality. With reference to FIG. 7, the pilot device 104 can be described as performing a process or method of controlling a regulator.

The method can include the on-board controller 154 of the pilot device 104 receiving feedback control signals from the feedback pressure sensor 106 (Block 300). The feedback control signals are indicative of pressures detected at the outlet 116 of the regulator 102. Then, the on-board controller 154 compares (Block 302) each feedback control signal to a set-point control value, which can be stored on the memory 200, to determine if the pressure at the outlet 116 of the regulator 102 is greater than a set-point pressure, which can also be stored on the memory 200. If it is determined that a feedback control signal is greater than the set-point control value such that the outlet pressure is greater than the set-point pressure, then the on-board controller 154 opens (Block 304) the exhaust valve 138 of the pilot device 104 to allow loading gas in the pilot device 104 to exhaust away from the top surface 132 of the diaphragm 126 of the regulator 102. After the exhaust valve is opened, the on-board controller 154 receives (Block 306) a loading control signal from the loading pressure sensor 140 of the pilot device 104. The loading control signal is indicative of a pressure in the pilot device 104 and on the top surface 132 of the diaphragm 126. The on-board controller 154 then compares (Block 308) the loading control signal to a predetermined minimum threshold value that is less than the set-point control value. If the loading control signal is equal to or less than the predetermined minimum threshold value, then the on-board controller 154 closes the exhaust valve 138 (Block 310) and returns to taking readings from the feedback pressure sensor 106 in the regular course of events. It is this closing of the exhaust valve 138 when the loading pressure on the top surface 132 of the diaphragm 126 (i.e., in the dome 152) falls to the predetermined threshold that protects the diaphragm 126 from experiencing the large pressure differences discussed above with reference to FIG. 4. That is, with the exhaust valve 138 closed before the dome pressure falls to zero, the imbalance of forces across the diaphragm 126 is minimized and the useful life and service timing of the regulator 102 are extended.

Referring back to Block 308 of FIG. 7, if while the exhaust valve 138 is open, the loading pressure (e.g., dome pressure) has not fallen to or below the predetermined minimum threshold pressure, then the on-board controller 154 does not do anything, but returns to Block 306 to receive subsequent signals from the loading pressure sensor 140. Additionally, referring back to block 302 of FIG. 7, if the outlet pressure does not rise above the set-point pressure, the focus of the present disclosure is avoided. That is, if the outlet pressure is determined not to be greater than the set-point pressure, then the on-board controller 154 determines (Block 312) whether the outlet pressure is less than the set-point pressure. If so, the on-board controller 154 opens (Block 314) the inlet valve 136 of the pilot device 104 to allow more supply gas to flow in and increase the pressure on the top surface of the diaphragm 126, which in turns increases flow through the regulator 102 and increases the outlet pressure. At this point, the process returns to Block 300 and the on-board controller 154 resumes the receipt of signals from the feedback pressure sensor 106 making needed corrections in real-time. Similarly, if at Block 312, the on-board controller 154 determines that outlet pressure is not less than the set-point pressure, the process also returns to Block 300 because this means that the outlet pressure is equal to the set-point pressure.

The foregoing description of the operation of the disclosed assembly 100 relies on a variety of parameters including a set-point pressure for the outlet 116 of the regulator 102 and a predetermined minimum threshold pressure or value for the loading pressure inside of the dome 152 acting on the top surface 132 of the diaphragm 126. The values of these parameters can be preset on the on-board controller 154 at the factory, for example, or they can be set upon installation by the service technician or by an operator during operation. For example, during installation or operation, the technician or operator may connect a personal computing device 108, as shown in FIG. 2, a tablet, or other hand-held computing device, for example, to the pilot device 104 via the communication interface 109. In one version the communication interface can include a USB port and the connection can be made by way of a USB cable, for example. Other connections of course are intended to be included herein such as wireless connections, network connections, LAN connections, internet connections, intranet connections, etc. Regardless of the specific connection the personal computing device 108 can be configured to enable the technician or operator to enter an input that is then sent to the pilot device 104 for programming. The input might include the value of the set-point pressure, the value of the predetermined minimum threshold pressure, or a percentage value, for example, for calculating the predetermined minimum threshold pressure based on the set-point pressure, or any combination of these and/or any other variables or operating parameters. Thus, it should be appreciated that the values of the different operating parameters, including the frequency at which the feedback pressure sensor 106 and loading pressure sensor 140 take pressure measurements, can be advantageously customized for any give application or operating environment as may be deemed desirable.

Based on the foregoing description, it should be appreciated that the device and methods described herein provide for a regulator diaphragm protection feature that is highly advantageous for applications using diaphragm sensed non-vented regulators, including metal diaphragm sensed non-vented regulators. Specifically, the discloses devices and methods reduce the magnitude of any imbalance in pressures across the diaphragm upon the occurrence of an abrupt termination of downstream demand and moreover improves start-up response times when downstream demands return after such terminations. These advantageously increase the useful life, reduce service frequency, and improve operational performance and accuracy.

What is claimed is:

1. A fluid flow control device, comprising:
a regulator including an inlet, an outlet, a control element, and a diaphragm assembly having a diaphragm operably coupled to the control element for moving the control element in response to pressure changes across the diaphragm to control the flow of fluid from the inlet to the outlet;
a pilot device coupled to the fluid regulator for loading a top surface of the diaphragm, the pilot device including an inlet port adapted to receive a supply of loading gas and having an inlet valve, an exhaust port having an exhaust valve, an outlet port in fluid communication with the top surface of the diaphragm of the regulator, a loading pressure sensor disposed between the inlet valve and the outlet valve and in fluid communication with the outlet port and the top surface of the diaphragm, and an on-board controller communicatively coupled to the inlet valve, the outlet valve, and the loading pressure sensor, the inlet valve operable between an open position to open the inlet port for delivering the supply of loading gas to the outlet port and the top surface of the diaphragm and a closed position to close the inlet port, and the exhaust valve operable between an open position to open the exhaust port and exhaust gas away from the top surface of the diaphragm and a closed position to close the exhaust port;
a feedback pressure sensor connected between the outlet of the regulator and the on-board controller of the pilot device, the feedback pressure sensor adapted to periodically sense a pressure at the outlet of the regulator and send a feedback control signal to the pilot controller, the feedback control signal indicative of the magnitude of the detected pressure;
the on-board controller including a memory, a processor, and logic stored on the memory, wherein the logic stored on the memory of the controller is executable by the processor for:
receiving the feedback control signals from the feedback pressure sensor,
comparing each feedback control signal to a set-point control value to determine if the pressure at the outlet of the regulator is greater than a set-point pressure,
opening the exhaust valve of the pilot device when a feedback control signal is determined to be greater than the set-point control value so that loading gas in the pilot device can exhaust away from the top surface of the diaphragm of the regulator,
receiving a loading control signal from the loading pressure sensor of the pilot device after opening the exhaust valve, the loading control signal indicative of a pressure on the top surface of the diaphragm,
comparing the loading control signal to a predetermined minimum threshold value that is less than the set-point control value,
closing the exhaust valve when the loading control signal is equal to or less than the predetermined minimum threshold value.

2. The device of claim 1, wherein the logic stored on the memory of the controller is further executable by the processor for closing the inlet valve of the pilot device when a feedback control signal is determined to be greater than the set-point control value so that loading gas.

3. The device of claim 1, wherein the predetermined minimum threshold value comprises a value in a range of approximately 50% to approximately 95% of the set-point control value, a value in a range of approximately 60% to approximately 95% of the set-point control value, a value in a range of approximately 70% to approximately 95% of the set-point control value, a value in a range of approximately 50% to approximately 90% of the set-point control value, a value in a range of approximately 60% to approximately 90% of the set-point control value, a value in a range of approximately 70% to approximately 90% of the set-point control value, a value in a range of approximately 50% to approximately 85% of the set-point control value, a value in a range of approximately 60% to approximately 85% of the set-point control value, or a value in a range of approximately 70% to approximately 85% of the set-point control value.

4. The device of claim 1, wherein the predetermined minimum threshold value comprises a value that is approximately 90% of the set-point control value.

5. The device of claim 1, wherein the logic stored on the memory of the controller is further executable by the processor for opening the inlet valve of the pilot device when a feedback control signal is determined to be less than the set-point control value so that supply of loading gas can pass through the inlet port and increase the pressure on the top surface of the diaphragm of the regulator.

6. The device of claim 1, wherein the pilot device further includes a communication interface adapted to facilitate communication with an auxiliary device.

7. The device of claim 6, wherein the communication interface includes a Universal Serial Bus (USB) port adapted to receive a Universal Serial Bus (USB) cable to facilitate communication between the on-board controller and a personal computer, a tablet, or a hand held computing device.

8. A pilot device for use with a fluid regulator assembly including fluid regulator and a feedback pressure sensor, the fluid regulator having an inlet, an outlet, a control element, and a diaphragm assembly with a diaphragm operably coupled to the control element for moving the control element in response to pressure changes across the diaphragm to control the flow of fluid from the inlet to the outlet, the feedback pressure sensor connected to the outlet of the fluid regulator to periodically sense outlet pressure, the pilot device comprising:
an inlet port adapted to receive a supply of loading gas and having an inlet valve;
an exhaust port having an exhaust valve;
an outlet port adapted to be placed in fluid communication with a top surface of a diaphragm of a regulator;
a loading pressure sensor disposed between the inlet valve and the outlet valve and in fluid communication with the outlet port; and
an on-board controller communicatively coupled to the inlet valve, the outlet valve, and the loading pressure sensor, the inlet valve operable between an open position to open the inlet port for delivering the supply of loading gas to the outlet port and the top surface of the diaphragm and a closed position to close the inlet port, and the exhaust valve operable between an open position to open the exhaust port and exhaust gas away from the top surface of the diaphragm and a closed position to close the exhaust port,
the on-board controller including a memory, a processor, and logic stored on the memory, wherein the logic stored on the memory of the controller is executable by the processor for:
receiving feedback control signals from a feedback pressure sensor, comparing each feedback control signal to a set-point control value to determine if the pressure at the outlet of the regulator is greater than a set-point pressure, opening the exhaust valve of the pilot device when a feedback control signal is determined to be greater than the set-point control value so that loading gas in the pilot device can exhaust away from the top surface of the diaphragm of the regulator, receiving a loading control signal from the loading pressure sensor of the pilot device after opening the exhaust valve, the loading control signal indicative of a pressure on the top surface of the diaphragm, comparing the loading control signal to a predetermined minimum threshold value that is less than the set-point control value, closing the exhaust valve when the loading control signal is equal to or less than the predetermined minimum threshold value.

9. The device of claim 8, wherein the logic stored on the memory of the controller is further executable by the processor for closing the inlet valve of the pilot device when a feedback control signal is determined to be greater than the set-point control value so that loading gas.

10. The device of claim 8, wherein the predetermined minimum threshold value comprises a value in a range of approximately 50% to approximately 95% of the set-point control value, a value in a range of approximately 60% to approximately 95% of the set-point control value, a value in a range of approximately 70% to approximately 95% of the set-point control value, a value in a range of approximately 50% to approximately 90% of the set-point control value, a value in a range of approximately 60% to approximately 90% of the set-point control value, a value in a range of approximately 70% to approximately 90% of the set-point control value, a value in a range of approximately 50% to approximately 85% of the set-point control value, a value in a range of approximately 60% to approximately 85% of the set-point control value, or a value in a range of approximately 70% to approximately 85% of the set-point control value.

11. The device of claim 8, wherein the predetermined minimum threshold value comprises a value that is approximately 90% of the set-point control value.

12. The device of claim 8, wherein the logic stored on the memory of the controller is further executable by the processor for opening the inlet valve of the pilot device when a feedback control signal is determined to be less than the set-point control value so that supply of loading gas can pass through the inlet port and increase the pressure on the top surface of the diaphragm of the regulator.

13. The device of claim 8, wherein the pilot device further includes a communication interface adapted to facilitate communication with an auxiliary device.

14. The device of claim 13, wherein the communication interface includes a Universal Serial Bus (USB) port adapted to receive a Universal Serial Bus (USB) cable to facilitate communication between the on-board controller and a personal computer, a tablet, or a hand held computing device.

15. A method of controlling a regulator with a pilot device having an inlet port with an inlet valve, an exhaust port with an exhaust valve, an outlet port connected to the regulator, and a loading pressure sensor for detecting the pressure in the outlet port, the method comprising:

periodically detecting an outlet pressure at an outlet of the regulator with a feedback pressure sensor;

comparing each detected outlet pressure with a set-point control pressure;

opening an exhaust valve of the pilot device when a detected outlet pressure is determined to be greater than the set-point control pressure so that a loading gas in the pilot device, which is applied to a top surface of a diaphragm of the regulator, exhausts out through the exhaust valve to reduce loading on the diaphragm;

sensing a loading pressure in the outlet port of the pilot valve with the loading pressure sensor after opening the exhaust valve;

comparing the loading pressure to a predetermined minimum threshold pressure;

closing the exhaust valve when the loading pressure is determined to be equal to or less than the predetermined minimum threshold value;

closing the inlet valve when the detected outlet pressure is determined to be greater than the set-point control pressure; and opening the inlet valve of the pilot device when a feedback control pressure is determined to be less than the set-point control pressure so that a supply of loading gas can pass through the inlet port and increase the pressure in the outlet port.

16. The method of claim 15, further comprising receiving an input signal indicative of the set-point pressure.

17. The method of claim 16, further comprising setting the predetermined minimum threshold value based on the input signal.

18. The method of claim 17, wherein setting the predetermined minimum threshold value comprises setting the predetermined minimum threshold value as a percentage of the set-point pressure, wherein the percentage is in a range of approximately 60% to approximately 95%, approximately 70% to approximately 95%, approximately 50% to approximately 90%, approximately 60% to approximately 90%, approximately 70% to approximately 90%, approximately 50% to approximately 85%, approximately 60% to approximately 85%, or approximately 70% to approximately 85%.

19. The method of claim 17, wherein setting the predetermined minimum threshold value comprises setting the predetermined minimum threshold value to approximately 90% of the set-point pressure.

20. The method of claim 15, further comprising receiving an input signal that is indicative of the predetermined minimum threshold value.

21. The method of claim 20, further comprising setting the predetermined minimum threshold value based on the input signal.

* * * * *

UNITED STATES PATENT AND TRADEMARK OFFICE
CERTIFICATE OF CORRECTION

| | | |
|---|---|---|
| PATENT NO. | : 9,477,237 B2 | Page 1 of 1 |
| APPLICATION NO. | : 14/252969 | |
| DATED | : October 25, 2016 | |
| INVENTOR(S) | : Gordon Cameron Muir et al. | |

It is certified that error appears in the above-identified patent and that said Letters Patent is hereby corrected as shown below:

In the Specification

At Column 5, Line 9, "pilot device 140" should be -- pilot device 104 --.

At Column 5, Line 10, "pressure sensor 104" should be -- pressure sensor 140 --.

At Column 7, Lines 26-27, "controller 106," should be -- sensor 106, --.

At Column 9, Line 33, "value such" should be -- value so --.

At Column 10, Line 60, "discloses" should be -- disclosed --.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*